(12) United States Patent
Shankar (10) Patent No.: US 9,432,123 B2
(45) Date of Patent: Aug. 30, 2016

(54) ADAPTIVE MACH ZEHNDER MODULATOR LINEARIZATION

(71) Applicant: INPHI CORPORATION, Santa Clara, CA (US)

(72) Inventor: Hari Shankar, Westlake Village, CA (US)

(73) Assignee: INPHI CORPORATION, Santa Clara, CA (US)

( * ) Notice: Subject to any disclaimer, the term of this patent is extended or adjusted under 35 U.S.C. 154(b) by 137 days.

(21) Appl. No.: 14/179,447

(22) Filed: Feb. 12, 2014

(65) Prior Publication Data

US 2015/0229403 A1    Aug. 13, 2015

(51) Int. Cl.
*H04B 10/588* (2013.01)
*H04B 10/50* (2013.01)

(52) U.S. Cl.
CPC .. *H04B 10/50572* (2013.01); *H04B 10/50593* (2013.01); *H04B 10/588* (2013.01)

(58) Field of Classification Search
USPC ....... 398/188, 193, 198, 158, 192, 296, 116, 398/194, 185; 375/296
See application file for complete search history.

(56) References Cited

U.S. PATENT DOCUMENTS

| | | | |
|---|---|---|---|
| 6,522,688 B1 * | 2/2003 | Dowling | H04B 3/23 375/222 |
| 2002/0051274 A1 * | 5/2002 | Kim | G02F 1/0123 359/237 |
| 2002/0167693 A1 * | 11/2002 | Vrazel | G11C 27/02 398/27 |
| 2002/0196863 A1 * | 12/2002 | Kaku | H04L 27/2624 375/285 |
| 2004/0161249 A1 * | 8/2004 | Suda | H04B 10/503 398/198 |
| 2009/0232518 A1 * | 9/2009 | Caton | H04B 10/5051 398/193 |
| 2010/0119239 A1 * | 5/2010 | Wang | H04B 10/50575 398/198 |
| 2012/0134676 A1 * | 5/2012 | Kikuchi | H04B 10/532 398/65 |

OTHER PUBLICATIONS

Open Compute Project, "Home-Open Compute Project", www.opencompute.org.
PCI-SIG, "PCI Express Specification", www.pcisig.com.
HPCC, "G-RandomAccess GUPs Benchmark", icl.cs.utk.edu/hpcc/index.html.

* cited by examiner

*Primary Examiner* — David Payne
*Assistant Examiner* — Omar S Ismail
(74) *Attorney, Agent, or Firm* — Richard T. Ogawa; Ogawa P.C.

(57) ABSTRACT

The present invention is directed to optical communication systems and methods thereof. In various embodiments, the present invention provides method for linearizing Mach Zehnder modulators by digital pre-compensation and adjusting the gain of the driver and/or the modulation index. The pre-compensation can be implemented as a digital pre-compensation algorithm, which is a part of an adaptive feedback loop. There are other embodiments as well.

19 Claims, 11 Drawing Sheets

ADAPTIVE MACH ZEHNDER MODULATOR LINEARIZATION

CROSS-REFERENCES TO RELATED APPLICATIONS

This patent application is related to the U.S. patent application Ser. No. 13/791,201, filed Mar. 8, 2013, titled "OPTICAL COMMUNICATION INTERFACE UTILIZING CODED PULSE AMPLITUDE MODULATION", which is incorporated by reference herein for all purposes.

STATEMENT AS TO RIGHTS TO INVENTIONS MADE UNDER FEDERALLY SPONSORED RESEARCH AND DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

The present invention is directed to optical communication systems and methods thereof.

With advent of the Internet, cloud computing, and social networks, there is an ever increasing demand on the data communication network. To provide high speed data communication, optical communication network is one of the top choices. To transmit data through optical communication network, electrical signals are modulated into optical signals. Electrical signals can be modulated in various ways, such as phase modulation, amplitude modulation, polarization modulation, and/or combination thereof.

For electro-optic modulation, Mach-Zehnder (MZ) modulators are often used. For example, in a MZ modulator, a beam splitter divides the laser light into two paths, one of which has a phase modulator. The beams are then recombined. Changing the electric field on the phase modulating path will then determine whether the two beams interfere constructively or destructively at the output, and thereby control the amplitude or intensity of the exiting light.

Over the past, there has been many implementation of MZ modulators, but unfortunately they have been inadequate as explained below. Therefore, improved system and methods for MZ modulation systems are desired.

BRIEF SUMMARY OF THE INVENTION

The present invention is directed to optical communication systems and methods thereof. In various embodiments, the present invention provides method for linearizing Mach Zehnder modulators by digital pre-compensation and adjusting the gain of the driver and/or the modulation index. The pre-compensation can be implemented as a digital pre-compensation algorithm, which is a part of an adaptive feedback loop. There are other embodiments as well.

According to an embodiment, the present invention provides a modulation system. The system has a nonlinear mapping module that is configured to perform a mapping process to generate a voltage signal using a modulation signal and a first modulation index. The system also includes a DAC module that is configured to convert the voltage signal to an analog signal. The system additionally includes a driver module that is configured to generate a driving signal using the analog signal and a gain value. The driver module is configured to adjust the gain value in response to a compensation signal. The system also has a peak detection module that is configured to determine a peak value associated with the driving signal. The system additionally includes an MZ modulator configured to generate an output signal using at least the driving signal. The output signal is associated a half wave voltage value. Moreover, the system includes a compensation module configured to generate the compensation signal using at least the first modulation index and the second module index. The second modulation index being a function of the peak value and the half wave voltage value.

According to another embodiment, the present invention provides a modulation system that includes a nonlinear mapping module configured to perform a mapping process to generate a voltage signal using a modulation signal and a first modulation index. The system includes a DAC module configured to convert the voltage signal to an analog signal. Additionally, the system includes a driver module configured to generate a driving signal using the analog signal and a gain value. The driver module is further configured to adjust the gain value in response to a compensation signal. The system additionally includes a peak detection module configured to determine a peak value associated with the driving signal. Furthermore, the system includes an MZ modulator configured to generate an output signal using at least the driving signal. The output signal is associated a half wave voltage value. The system also includes a compensation module configured to generate the compensation signal using at least the first modulation index and the second module index. The second modulation index is a function of the peak value and the half wave voltage value.

According to another embodiment, the present invention provides a method for modulating signals. The method includes performing nonlinear mapping a modulation signal using a first modulation index to generate a voltage signal. The method also includes processing the voltage signal using a linear equation. The method further includes converting the processed voltage signal to an analog signal. The method additionally includes processing the analog signal at a gain value to generate a driving signal. Moreover, the method includes performing MZ modulation on the driving signal to generate an output signal. The method also includes determining a second modulation index based at least on the driving signal and the first modulation index. The method further includes adjusting the gain value using the second modulation index.

It is to be appreciated that embodiments of the present invention provides numerous advantages over conventional systems and methods. As described below in further details, the linearization provided by the embodiments of the present invention improves performance of MZ modulators, and thus enhancing optical network and other applications. In addition, various aspects of the present invention are compatible with existing techniques, and can be readily incorporated or otherwise adopted into existing systems. There are other benefits as well.

DETAILED DESCRIPTION OF THE INVENTION

The present invention is directed to optical communication systems and methods thereof. In various embodiments, the present invention provides method for linearizing Mach Zehnder modulators by digital pre-compensation and adjusting the gain of the driver and/or the modulation index. The pre-compensation can be implemented as a digital pre-compensation algorithm, which is a part of an adaptive feedback loop. There are other embodiments as well.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Figure 1:
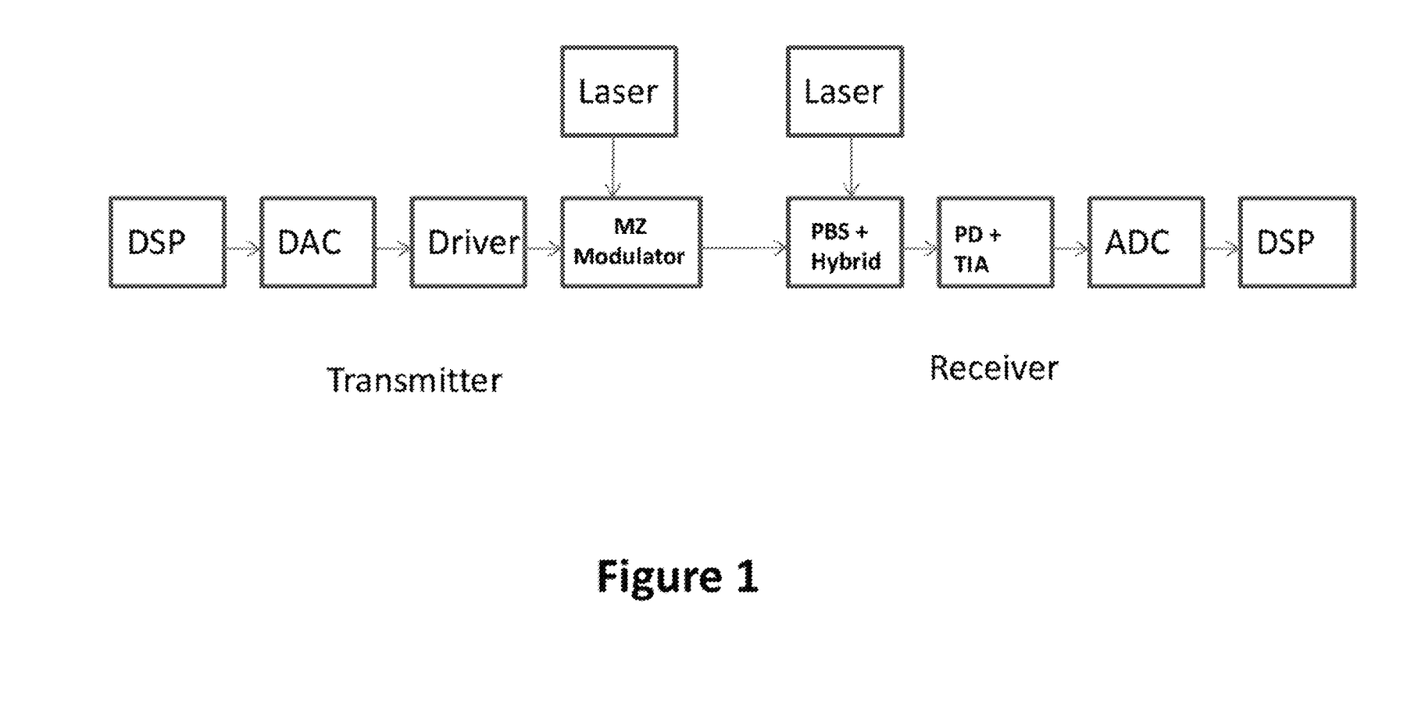
FIG. 1 is a simplified diagram illustrating a coherent optical system.

As explained above, optical communication networks are widely used for data communication. In order to meet increasing demands of data traffic, optical communication systems are transitioning from non-coherent architecture to coherent architecture. FIG. 1 is a simplified diagram illustrating a coherent optical system.

Among other features, coherent optical communication network systems, in comparison to non-coherent systems, have better sensitivity and higher spectral efficiency, thereby being capable of tolerating higher chromatic and polarization mode dispersion. In addition, coherent receivers allow for phase and amplitude modulation. For example, modulation formats such as QAM and OFDM modulation have been considered for coherent optical systems. Techniques such as pulse shaping and pre-compensation for chromatic dispersion can be deployed at the transmitters of coherent systems. To implement coherent systems, linear transmitter is needed.

Figure 2:
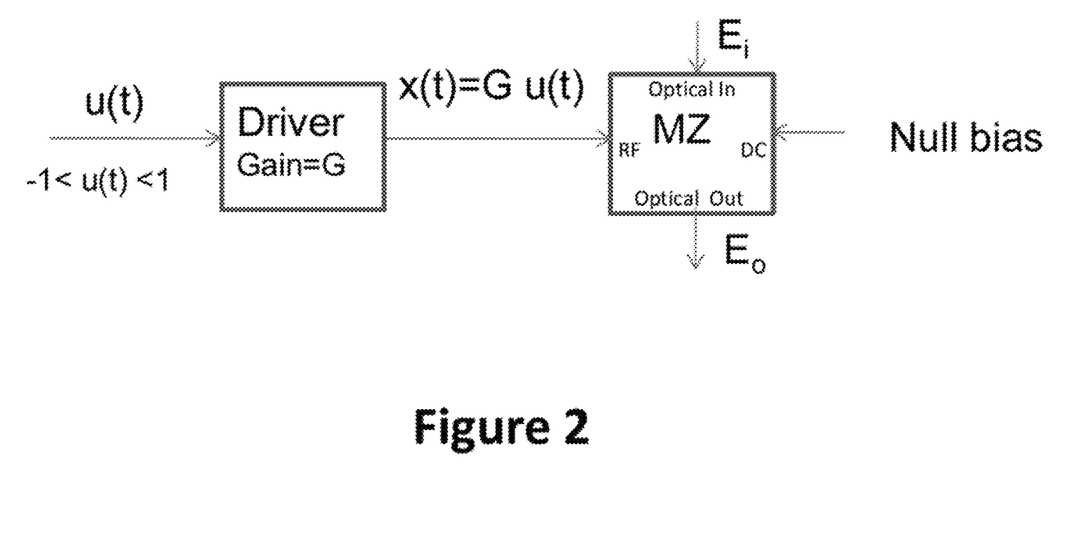
FIG. 2 is a simplified diagram illustrating a transmitter for coherent optical system.

For modulation, MZ modulators are used to modulate the magnitude and phase of the electric field at the transmitter, shown in FIG. 2. FIG. 2 is a simplified diagram illustrating a transmitter for coherent optical system. Here u(t) is the modulating signal, which is amplified by a linear amplifier or driver to produce the signal x(t). We will assume that u(t) is normalized such that $-1 <= u(t) <= 1$. Ei and Eo are the input and output optical fields of the MZ modulator.

The transfer function of an ideal lossless MZ biased at the null point is given by $$E_o = E_i \sin\left(\frac{\pi}{2V_\pi} x(t)\right) \qquad \text{Equation 1}$$

$V_\pi$ is the half wave voltage of the MZ modulator. Since coherent receivers detect the electric field (and not optical power), the relevant transfer function for the MZ modulator is from the electrical RF port to the optical electric field. As can be seen from the above equation, the transfer function is not linear, and it is needed to linearize the transmitter.

One method of linearizing the modulator is to make the modulating signal sufficiently small so that the approximation below holds:

$$E_o \approx E_i \frac{\pi}{2V_\pi} x(t) \qquad \text{Equation 2}$$

Figure 3:
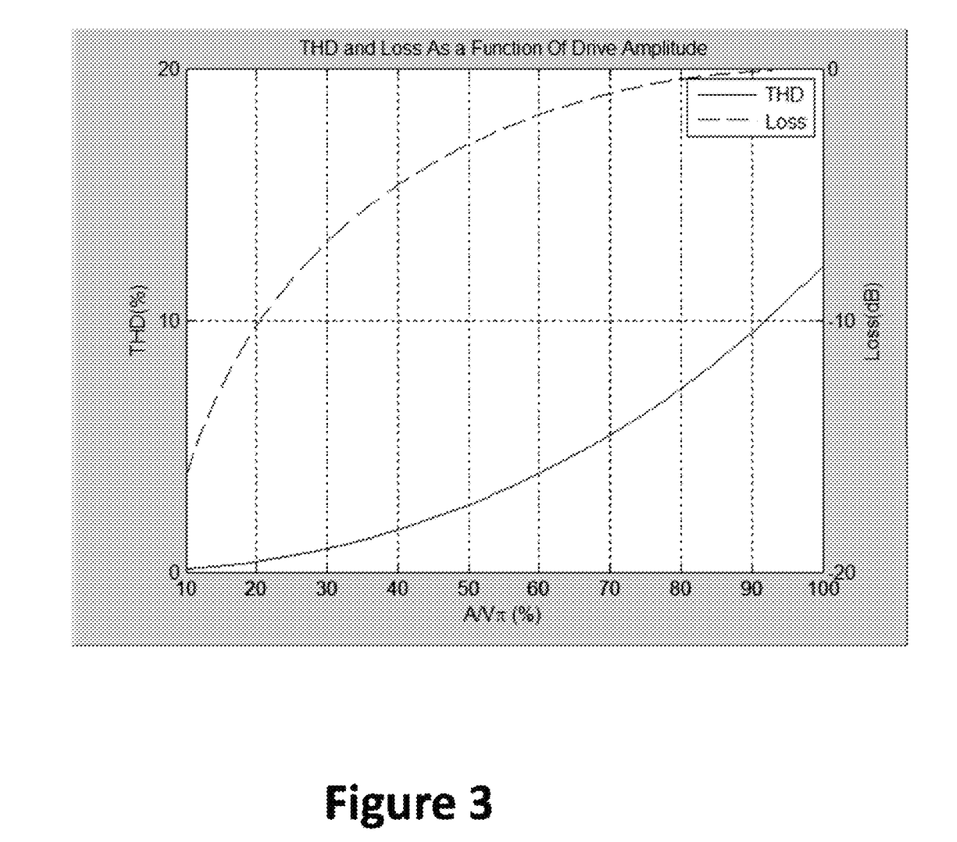
FIG. 3 is a simplified graph illustrating the total harmonic distortion and loss of a MZ modulator.

Unfortunately, making the modulating signal sufficiently small leads to a loss of power at the output of the modulator. As a result of the small modulating signal, additional optical amplification is needed. If x(t) is increased, the nonlinearity of the modulator increases. For example, one measure of the nonlinearity is the total harmonic distortion (THD) which is a measure of the distortion when x(t) is a sinusoidal signal, $x(t) = A \sin(\omega t)$. FIG. 3 is a simplified graph illustrating the total harmonic distortion and loss of a MZ modulator. More specifically, FIG. 3 shows an increase in THD when the amplitude of the modulating signal is increased. Also shown in FIG. 3 is the corresponding loss in the output optical power of the modulator as the input amplitude is decreased.

Figure 4:
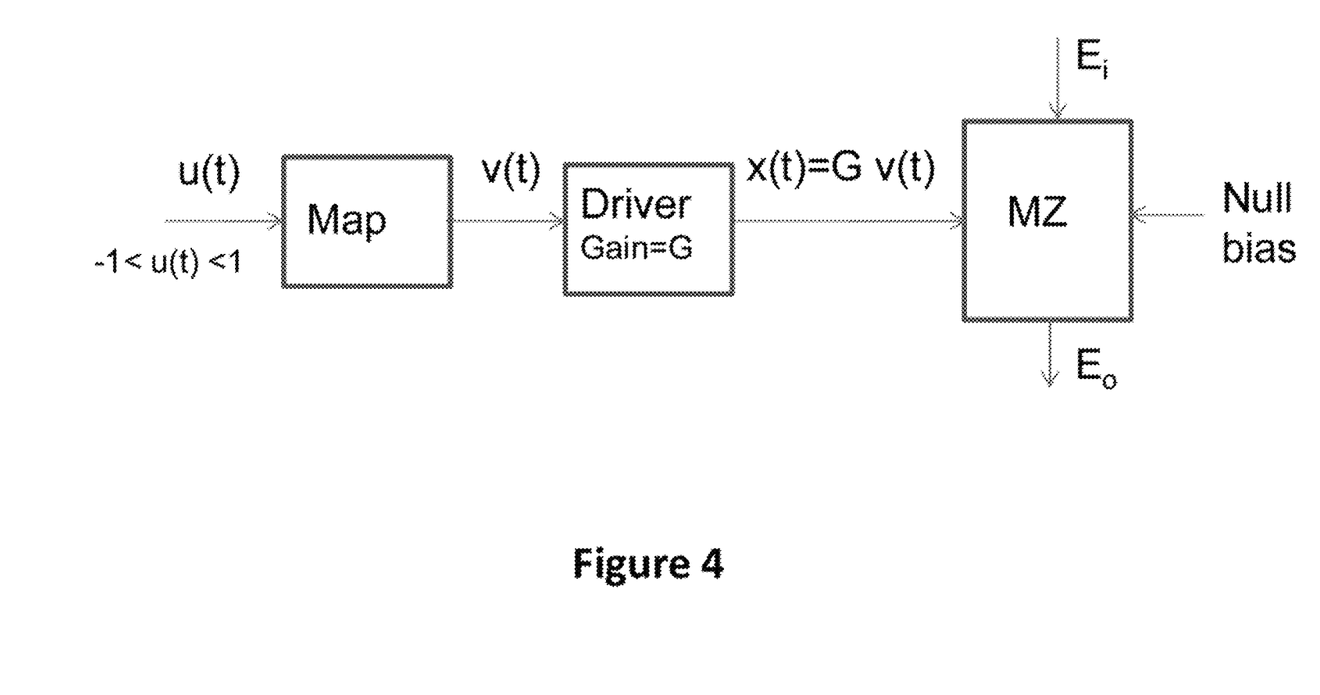
FIG. 4 is a simplified diagram illustrating pre-distortion functioning associated with linearizing a MZ modulator.

An alternate method is to remap the signal using the inverse transformation of the MZ modulator, as shown in FIG. 4. FIG. 4 is a simplified diagram illustrating pre-distortion associated with linearizing a MZ modulator. Let the gain of the driver be such that:

$$-\alpha V_\pi < x(t) < \alpha V_\pi \text{ where } 0 < \alpha < 1 \quad \text{Equation 3}$$

The variable $\alpha$ here is referred to as the modulation index. Let the map from u(t) to v(t) be defined by $$v(t) = \frac{1}{\alpha}\sin^{-1}(\beta u(t)) \text{ where } \beta = \sin\left(\alpha\frac{\pi}{2}\right) \quad \text{Equation 4}$$

Since we have assumed that u(t) is normalized to $-1 \leq u(t) \leq 1$, $\beta u(t)$ also lies in the range $[-1, 1]$ and the map from u(t) to v(t) is well defined. Further $-\pi/2 < v(t) < \pi/2$.

In order to satisfy the condition in equation 3, the gain of the driver is given by the equation $$G = \frac{2\alpha V_\pi}{\pi} \quad \text{Equation 5}$$

Then the output electric field of the MZ modulator is:

$$E_o = E_i \sin\left(\frac{\pi}{2V_\pi}x(t)\right) = E_i \sin\left(\frac{\pi}{2V_\pi}Gv(t)\right) \quad \text{Equation 6}$$

$$= E_i \sin\left(\frac{\pi}{2V_\pi}\frac{2\alpha V_\pi}{\pi}\frac{1}{\alpha}\sin^{-1}(\beta u)\right)$$

$$= E_i \beta u$$

The output E-field is a linear function of the signal u(t) and $\beta$ is the effective gain of this linearized transmitter. Note that the mapping in Equation 4 is a function of the modulation index $\alpha$. Further, the gain of the driver is also a function of the modulator half wave voltage $V_\pi$ and the modulation index $\alpha$.

Figure 5:
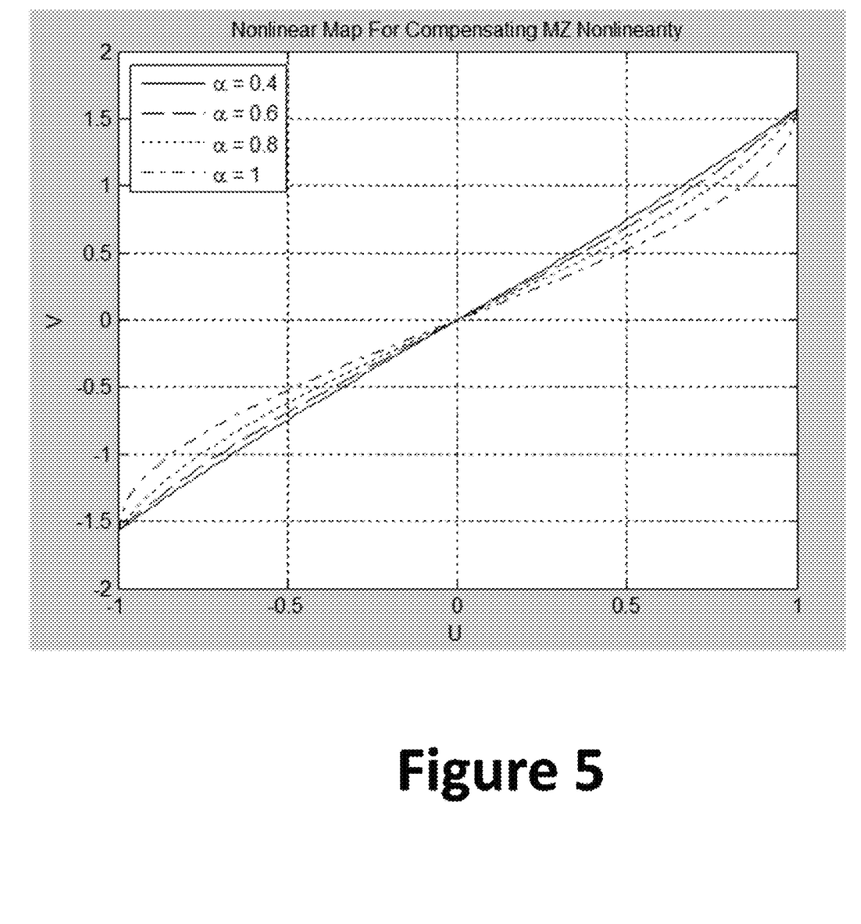
FIG. 5 is a simplified graph illustrating a nonlinear pre-distortion map for compensating MZ nonlinearity.

FIG. 5 is a simplified graph illustrating a nonlinear pre-distortion map for compensating MZ nonlinearity. More specifically, FIG. 5 shows the map from u->v for different values of the modulation index $\alpha$. As $\alpha$->0, the transformation becomes linear which is to be expected because for small swings relative to $V_\pi$, $\sin(\pi/(2 V_\pi) X)$->$\pi/(2 V_\pi)X$. In this case the MZ behaves like a linear element and no pre-compensation is required.

Figure 6:
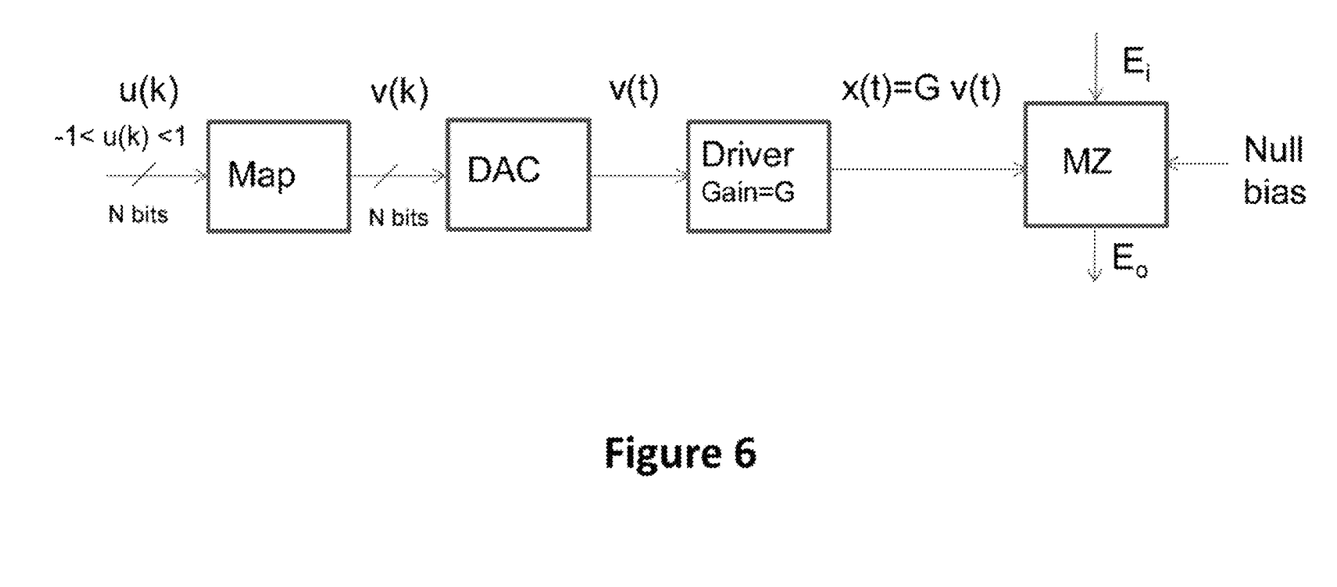
FIG. 6 is a simplified block diagram illustrating a digital implementation of pre-distortion portion of a MZ modulator.

As an example, the map from u->v can be implemented digitally, as shown in FIG. 6. FIG. 6 is a simplified block diagram illustrating a digital implementation of pre-distortion portion of a MZ modulator.

If $V_\pi$ of the modulator is known and the gain of the driver can be fixed accurately, then the system can be set up for a given value of $\alpha$, which is used in the DSP for the pre-compensation algorithm. However due to variations in $V_\pi$ and in the gain of the driver, the modulation index can vary.

Figure 7:
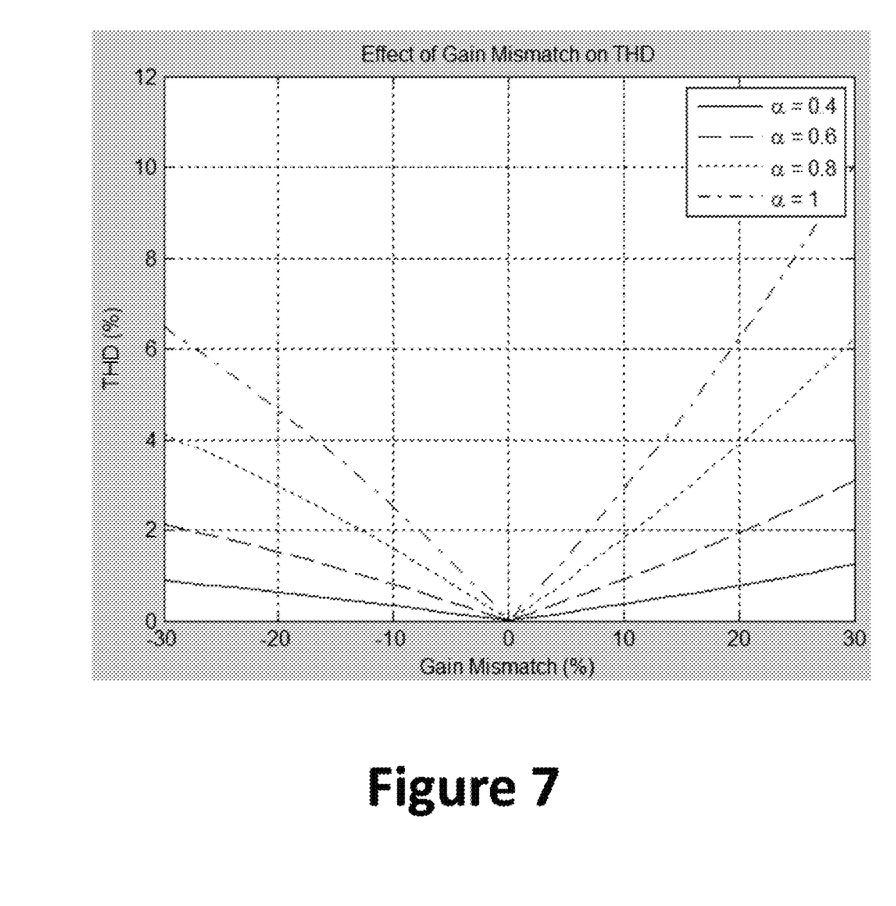
FIG. 7 is a simplified graph illustrating effect of gain mismatch on total harmonic distortion.

Next consider the case when the signal is pre-compensated for a swing of $\alpha$, but the gain of the driver is set such that the actual modulation index is $\alpha'$. This is effectively a mismatch between the gain of the driver and the value of the modulation index assumed in the DSP. FIG. 7 is a simplified graph illustrating effect of gain mismatch on total harmonic distortion. More specifically, FIG. 7 shows the effect of this gain mismatch on the linearity of the transmitter for different drive strengths. As shown, the mismatch has a greater effect for larger drive strengths.

Therefore, it is to be appreciated that according to various embodiments of the present invention, an adaptive linearization mechanism is provided for coherent optical communication systems, and a feedback loop is used to adjust gain and/or pre-distortion at the input of the MZ modulator.

To measure the modulated signal (e.g., for the purpose of measuring MZ modulator distortion) at the output of the Mach Zehnder, a high speed receiver is needed. High-speed receivers are typically expensive to implement. As explained above, the modulation index is required to linearize the modulator and it can be determined without directly measuring the modulated optical signal. This feature allows for linearization of the Mach Zehnder modulator. In various embodiments, a low frequency transmit and receive path is provided at the transmitter, which can be implemented via the DC bias port of the MZ and a low speed photo diode (e.g., integrated into the MZ modulator) that are used to set the bias point of the MZ. A biasing technique is used to modulate the bias port with a low frequency sinusoidal signal of low amplitude. To set the MZ at the null bias point, the DC bias is varied until the fundamental and odd harmonics of the modulating signal are minimized (e.g., even harmonics are maximized).

In various embodiments, the ratio of the DC to the $2^{nd}$ harmonic or the ratio of the second harmonic to the fourth harmonic is measured. These ratios allow for measurement of the modulation index. The use of these ratios can be demonstrated by using Equation 1: by letting the modulating signal x(t) be a sinusoidal signal of the form $x(t)=A \sin(\omega_0 t)$. The output power is obtained by squaring Equation 1, as shown in Equation 7 below:

$$P_o = \frac{P_i}{2}\left(1 - \cos\left(\frac{2\pi}{2V_\pi}A\sin(\omega_0 t)\right)\right) \quad \text{Equation 7}$$

By using standard Fourier series analysis, Equation 8 below is obtained:

$$\cos(\beta\sin(\theta)) = J_0(\beta) + \sum_{k=1}^{\infty} 2J_{2k}(\beta)\cos(2k\theta) \quad \text{Equation 8}$$

In Equation 8, $J_n( )$ is the nth order Bessel function of the first kind. Using Equation 7 and Equation 8, Equation 9 below can be obtained, which describes the output power for a sinusoidally modulated MZ biased at the null point:

$$P_o = \frac{P_i}{2} + \quad \text{Equation 9}$$

$$\frac{P_i}{2}(J_0(2X) + 2J_2(2X)\cos(2\omega_0 t) + 2J_4(2X)\cos(4\omega_0 t) - \ldots),$$

Where:

$$X = \frac{\pi A}{2V_\pi},$$

A=amplitude of sinusoid,

From Equation 9, Equation 10 and Equation 11 can be determined:

$$\frac{\text{Power in DC}}{\text{Power in 2nd harmonic}} = \frac{1 + J_0(2X)}{2J_2(2X)} \quad \text{Equation 10}$$

$$\frac{\text{Power in 2nd harmonic}}{\text{Power in 4th harmonic}} = \frac{J_2(2X)}{J_4(2X)} \quad \text{Equation 11}$$

Figure 8:
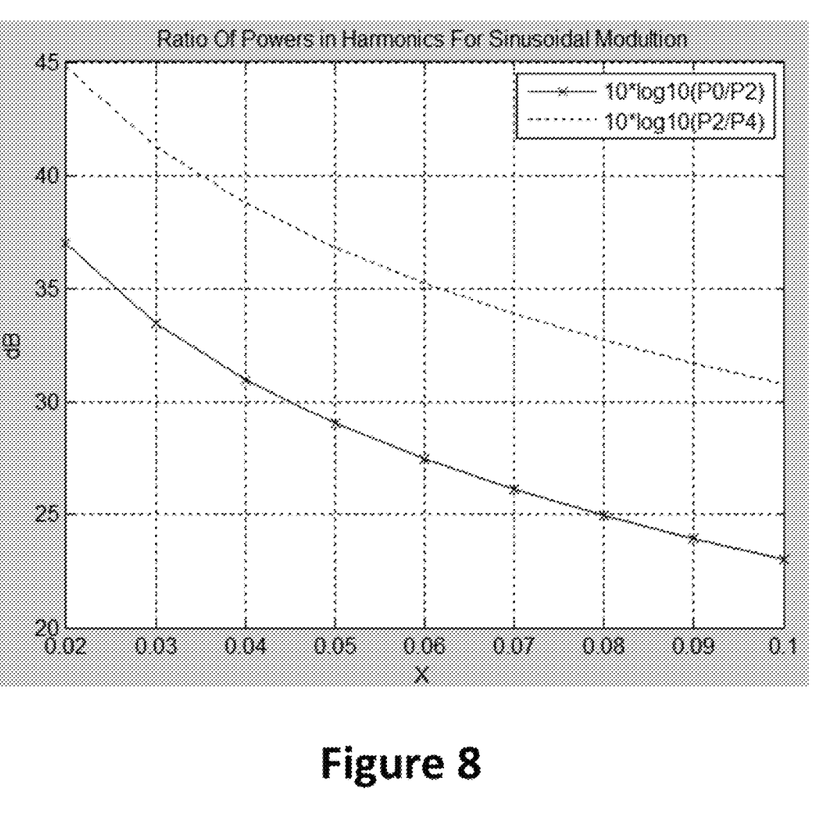
FIG. 8 is a simplified graph illustrating ratio of powers in harmonics as a function of modulating index.

FIG. 8 is a simplified graph illustrating ratio of powers in harmonics as a function of modulating index. More specifically, ratios $P_0/P_2$ and $P_2/P_4$ are shown in FIG. 8. For example, by measuring either of these ratios, the value of X in Equation 9 can be determined. For a known value of "A" (i.e., amplitude of sinusoid), the value of $V_\pi$ can be determined. Depending on the implementation, the power in the harmonics, $P_0$, $P_2$, and $P_4$ can be measured by analog means using analog filters and power detectors, or by using an ADC and processing the samples digitally.

Once the value of $V_\pi$ is determined, it can be compared to the amplitude of the modulating signal x(t) in order to determine the modulation index. At the RF port of the MZ modulator, the maximum value of the drive signal can be determined with a peak detector. The ratio of the peak detector output to $V_\pi$ now gives the actual modulation index of the system. The gain of the driver can be adjusted till the required ratio is obtained.

As an example, assume that MZ is to be driven at 80% of $V_\pi$, i.e. the peak value of x(t) should be $0.8*V_\pi$. Hence the digital pre-compensation for the MZ sinusoidal nonlinearity is computed for a value of $\alpha=0.8$. Assume that a measurement on the photodiode output of the MZ modulator shows that the ratio of the powers in the $2^{nd}$ to the $4^{th}$ harmonic is $10*\log 10(P_2/P_4)=35$ dB. As can be seen from FIG. 8, X=0.06 corresponds to this ratio of $P_2/P_4$. Assume that a separate measurement of A, the amplitude of the sinusoidal modulating signal gives A=0.2V. Then $V_\pi=\pi*0.2/(2*0.06)=5.24V$. Next assume that the peak detector at the output of the driver gives a value of 5V. The driver gain is now adjusted till the peak detector output corresponds to a maximum drive voltage of $0.8*5.24=4.2V$. At this point the MZ is being driven at the required value and the digital pre-compensation matches the analog drive signal. It is to be appreciated this process is implemented as a MZ controller algorithm according to various embodiments of the present invention.

Figure 9:
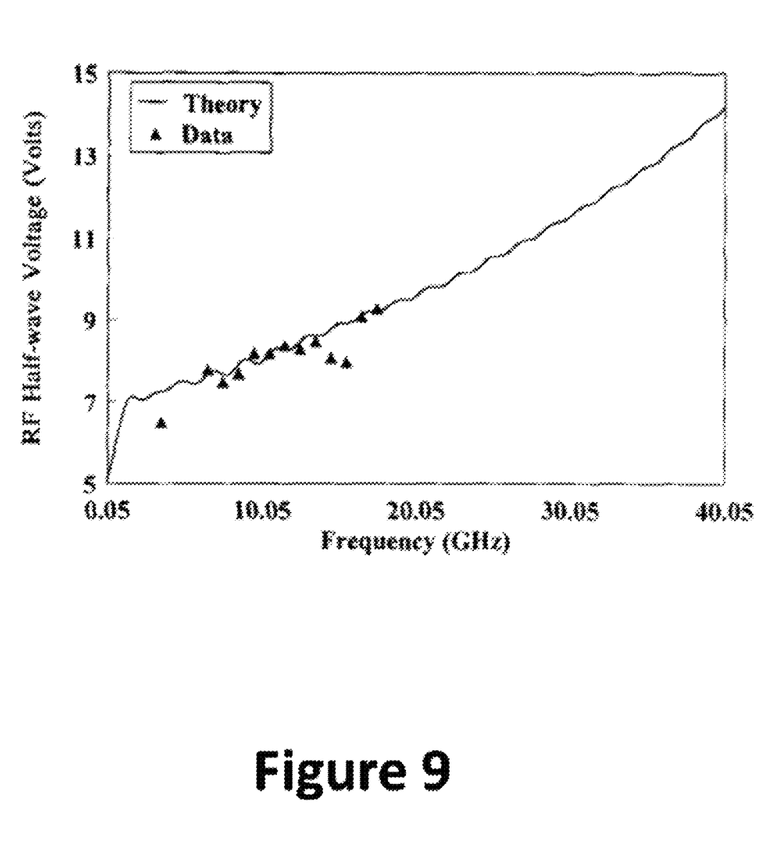
FIG. 9 is a graph illustrating frequency dependency of a MZ voltage.

According to the process described above, the measured value of $V_\pi$ is at a low frequency. $V_\pi$ is a function of frequency, and the dependence is mainly due to the high frequency loss in the electrical components and the electrical waveguides in the MZ modulator. FIG. 9 is a graph illustrating frequency dependency of a MZ voltage.

The frequency dependence of $V_\pi$ can be expressed as $$V_\pi = V_{\pi 0} H(f) \qquad \text{Equation 12}$$

where $V_{\pi 0}$ is the DC (low frequency) value of $V_\pi$ and H(f) represents the frequency dependence. We assume that the inverse of this transfer function is well defined and is denoted as U(f), i.e., $$U(f)=1/H(f) \qquad \text{Equation 13}$$

The output of the modulator can then be expressed as $$E_o = E_i \sin\left(\frac{\pi}{2V_{\pi 0}} \mathfrak{J}^{-1}(U(f)X(f))\right) \qquad \text{Equation 14}$$

where $\mathfrak{J}^{-1}$ is the inverse Fourier transform and X(f) is the Fourier transform of x(t). Hence we can equalize the signal after the nonlinear map with the transfer function $H_{eq}(f)=1/U(f)$ to get rid of this frequency dependency and effectively keep $V_\pi$ constant across frequency.

$$\begin{aligned} E_o &= E_i \sin\left(\frac{\pi}{2V_{\pi 0}} \mathfrak{J}^{-}(U(f)X(f)H_{eq}(f))\right) \\ &= E_i \sin\left(\frac{\pi}{2V_\pi} \mathfrak{J}^{-1}(X(f))\right) \\ &= E_i \sin\left(\frac{\pi}{2V_{\pi 0}} x(t)\right) \end{aligned} \qquad \text{Equation 15}$$

This now reduces to the previous case where $V_\pi$ was assumed to be constant (see Equation 1), and the techniques previously described are applicable. Once again the map from the signal u(t) to the output electric field of the MZ modulator is a linear mapping.

Figure 10:
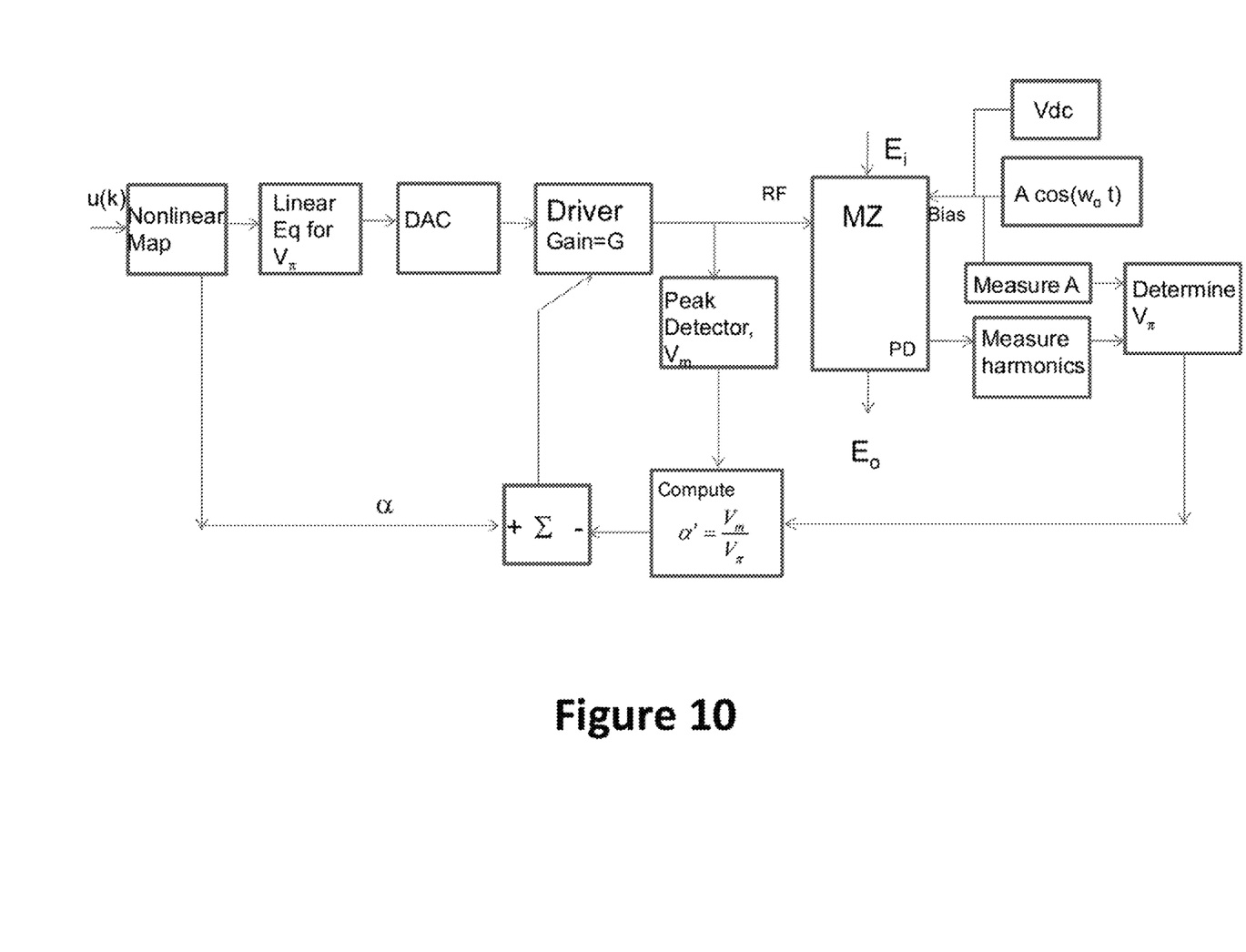
FIG. 10 is a simplified block diagram illustrating a feedback look for setting driver gain for MZ linearization.

The resulting system is shown in FIG. 10. For example, FIG. 10 is a simplified block diagram illustrating a feedback look for setting driver gain for MZ linearization according to an embodiment of the present invention. This diagram is merely an example, which should not unduly limit the scope of the claims. One of ordinary skill in the art would recognize many variations, alternatives, and modifications. For example, the process performed is effectively a linear system from u(k) to $E_o$.

Figure 11:
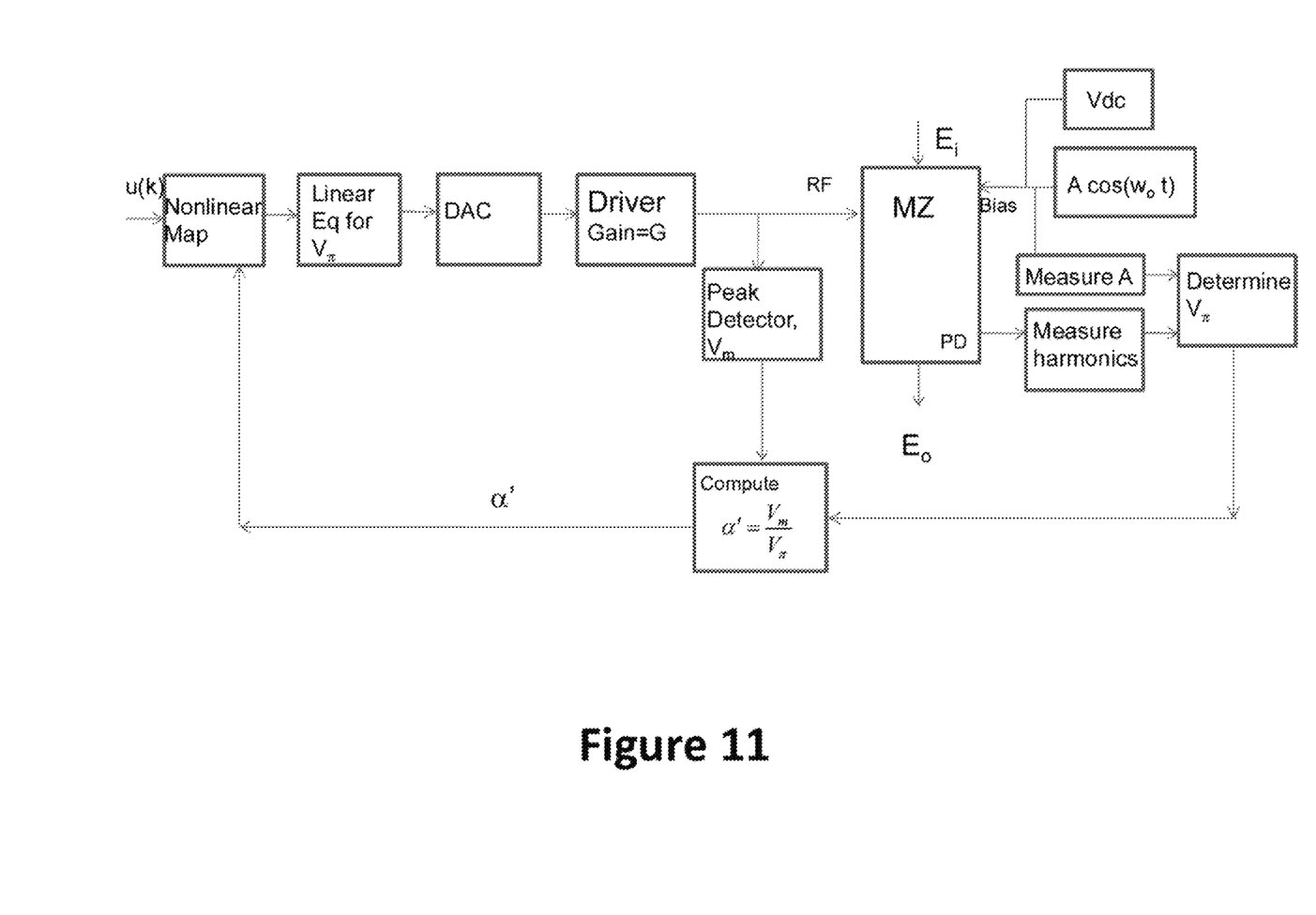
FIG. 11 is a simplified block diagram illustrating a feedback look for setting nonlinear pre-distortion of MZ linearization.

Another way to provide MZ linearization is to modify the nonlinear map based upon the measured value $\alpha'$ and leave the gain of the driver fixed. FIG. 11 is a simplified block diagram illustrating a feedback look for setting nonlinear pre-distortion of MZ linearization according to an embodiment of the present invention. This diagram is merely an example, which should not unduly limit the scope of the claims. One of ordinary skill in the art would recognize many variations, alternatives, and modifications. To use the numerical example worked previously, the digital pre-compensation is initially calculated for a value of $\alpha=0.8$, the measured value of $V_\pi=5.24$ V and a peak detector value of 5V gives $\alpha'=5/5.24=0.95$. This value is fed back to the nonlinear map in the DSP and the pre-compensation is recomputed for this new value of $\alpha'=0.95$. The gain of the driver is left unchanged. The pre-compensation now matches the analog drive signal.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A modulation system comprising:
   a nonlinear mapping module being configured to perform a mapping process to generate a voltage signal using a modulation signal and a first modulation index using an inverse transformation function;
   a DAC module being configured to convert the voltage signal to an analog signal;
   a driver module being configured to generate a driving signal using the analog signal and a gain value, the driver module further being configured to adjust the gain value in response to a compensation signal;
   a peak detection module in a transmitter being configured to determine a peak value associated with the driving signal;
   an MZ modulator being configured to generate an output signal using at least the driving signal, the output signal being associated a half wave voltage value; and
   a compensation module being configured to generate the compensation signal using at least the first modulation index and the second module index, the second modulation index being a function of the peak value and the half wave voltage value.

2. The system of claim 1 wherein the MZ modulator receives a biased signal characterized by an amplitude value, the half wave voltage value being determined based on the amplitude value and measured harmonics of the output signal.

3. The system of claim 1 wherein the second modulation index is determined by computing a ratio between the peak value and the half wave voltage value.

4. The system of claim 1 further comprising a linear equation module for processing the voltage signal.

5. The system of claim 1 wherein the MZ modulator is biased by a reference voltage.

6. The system of claim 1 wherein the MZ modulator is electrically coupled to a photo diode.

7. The system of claim 1 further comprising a DC source for biasing the MZ modulator.

8. A modulation system comprising:
a nonlinear mapping module being configured to perform a mapping process to generate a voltage signal using a modulation signal and an adjustable modulation index value using an inverse transformation function;
a DAC module being configured to convert the voltage signal to an analog signal;
a driver module being configured to generate a driving signal using the analog signal and a gain value;
a peak detection module in a transmitter being configured to determine a peak value associated with the driving signal;
an MZ modulator being configured to generate an output signal using at least the driving signal, the output signal being associated a half wave voltage value; and
a compensation module being configured to determine the adjustable modulation index value based on the peak value and the half wave voltage value.

9. The system of claim 8 wherein the MZ modulator receives a biased signal characterized by an amplitude value, the half wave voltage value being determined based on the amplitude value and measured harmonics of the output signal.

10. The system of claim 8 further comprising a linear equation module for processing the voltage signal; the linear equation module being configured to provide a signal compensation based at least on the modulation index value.

11. The system of claim 8 wherein the gain value is substantially constant.

12. The system of claim 8 wherein the modulator comprises a photo diode.

13. The system of claim 8 wherein the half wave voltage value is determined based on the amplitude value and measured harmonics of the output signal.

14. The system of claim 8 half wave voltage value is based at least on a measured power in 4th harmonic and 2nd harmonic.

15. A method for modulating signals comprising:
performing nonlinear mapping a modulation signal using a first modulation index to generate a voltage signal using an inverse transformation function;
processing the voltage signal using a linear equation;
converting the processed voltage signal to an analog signal;
processing the analog signal at a gain value to generate a driving signal;
measuring a peak voltage of the driving signal in a transmitter;
performing MZ modulation on the driving signal to generate an output signal;
determining a second modulation index based at least on the driving signal and the first modulation index; and
adjusting the gain value using the second modulation index.

16. The method of claim 15 further comprising measuring harmonics using the output signal.

17. The method of claim 15 further comprising determining a ratio between the peak value and a half wave voltage value.

18. The method of claim 15 further comprising amplifying the analog signal.

19. The method of claim 15 further comprising measuring a bias amplitude associated with an MZ modulator.

* * * * *